United States Patent
Shih et al.

(10) Patent No.: US 11,838,860 B2
(45) Date of Patent: Dec. 5, 2023

(54) METHOD OF PERFORMING CLOSED ACCESS GROUP SELECTION IN NON-PUBLIC NETWORK AND RELATED DEVICE

(71) Applicant: FG Innovation Company Limited, Tuen Mun (HK)

(72) Inventors: Mei-Ju Shih, Taipei (TW); Hung-Chen Chen, Taipei (TW); Yung-Lan Tseng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 67 days.

(21) Appl. No.: 17/334,916

(22) Filed: May 31, 2021

(65) Prior Publication Data
US 2021/0377850 A1 Dec. 2, 2021

Related U.S. Application Data

(60) Provisional application No. 63/033,130, filed on Jun. 1, 2020.

(51) Int. Cl.
*H04W 48/20* (2009.01)
*H04W 36/08* (2009.01)
*H04W 84/04* (2009.01)

(52) U.S. Cl.
CPC ........... *H04W 48/20* (2013.01); *H04W 36/08* (2013.01); *H04W 84/042* (2013.01)

(58) Field of Classification Search
CPC ... H04W 48/20; H04W 36/08; H04W 84/042; H04W 8/186; H04W 48/12; H04W 48/02
(Continued)

(56) References Cited

U.S. PATENT DOCUMENTS

| 2012/0142346 A1* | 6/2012 | Nakata | H04W 48/12 455/435.1 |
| 2013/0148565 A1* | 6/2013 | Jactat | H04W 4/08 370/312 |

(Continued)

FOREIGN PATENT DOCUMENTS

CN 110536483 A 12/2019

OTHER PUBLICATIONS

Intel Corporation,Remaining Details on TRS,3GPP TSG RAN WG1 Meeting 90bis Prague, CZ, Oct. 9-13, 2017,R1-1717376.
(Continued)

*Primary Examiner* — Michael Y Mapa
(74) *Attorney, Agent, or Firm* — ScienBiziP, P.C.

(57) ABSTRACT

A method of performing a closed access group (CAG) selection in a non-public network (NPN) for a user equipment (UE) is provided. The method includes receiving, from a CAG cell, a first indication and a CAG identity via a System Information Block 1 (SIB1), reporting, by an Access Stratum (AS) layer of the UE, to a Non-Access Stratum (NAS) layer of the UE, the first indication and the CAG identity when a request from the NAS layer is received, and performing a cell selection or reselection procedure according to the CAG identity, wherein the first indication is associated with the CAG identity and indicates that the CAG identity is allowed to be selected manually even if the CAG identity is not included in an allowed CAG list of the UE.

20 Claims, 6 Drawing Sheets

(58) Field of Classification Search
USPC .............. 455/435.1–444, 448–449; 370/331
See application file for complete search history.

(56) References Cited

U.S. PATENT DOCUMENTS

| | | | |
|---|---|---|---|
| 2019/0053207 A1 | 2/2019 | Kim et al. | |
| 2019/0110244 A1* | 4/2019 | Shih | H04W 76/27 |
| 2022/0191772 A1* | 6/2022 | Li | H04W 48/08 |
| 2022/0201592 A1* | 6/2022 | Lindheimer | H04W 48/18 |
| 2022/0417900 A1* | 12/2022 | Li | H04W 68/02 |

OTHER PUBLICATIONS

Spreadtrum Communications, Remaining issues on TRS, 3GPP TSG RAN WG1 Meeting 90bis Prague, CZ, Oct. 9-13, 2017, R1-1717747.

Qualcomm, Summary of [PRN] Cell Selection and selection, 3GPP TSG-RAN WG2 Meeting #109 electronic, Feb. 24-Mar. 6, 2020, R2-2001676.

Huawei, HiSilicon, China Telecom, Discussion on manual CAG selection, 3GPP TSG-RAN WG2 Meeting #109bis-e, Apr. 20- Apr. 30, 2020, R2-2003474.

Qualcomm Incorporated, "Suitable and acceptable NPN cells", R2-1913634, 3GPP TSG-RAN WG2 Meeting #107bis, Chongqing, China, Oct. 14-18, 2019.

CMCC, "Cell selection and reselection for NPN", R2-1915989, 3GPP TSG-RAN WG2 Meeting #108, Reno, USA, Nov. 18-22, 2019.

3GPP TS 38.304, "3rd Generation Partnership Project; Technical Specification Group Radio Access Network; NR; User Equipment (UE) procedures in Idle mode and RRC Inactive state (Release 16)", V16.0.0 (Mar. 2020).

3GPP TS 22.261, "3rd Generation Partnership Project; Technical Specification Group Services and System Aspects; Service requirements for the 5G system; Stage 1 (Release 17)", V17.2.0 (Mar. 2020).

3GPP TS 23.501, "3rd Generation Partnership Project; Technical Specification Group Services and System Aspects; System architecture for the 5G System (5GS); Stage 2 Release 16)", V16.4.0 (Mar. 2020).

\* cited by examiner

```
NPN-Identity-r16 ::=            CHOICE {
    pni-npn-r16                     SEQUENCE {
        plmn-Identity-r16               PLMN-Identity,
        manualCAGselectionAllowed-r16   BOOLEAN,
        cag-IdentityList-r16            SEQUENCE (SIZE (1..maxNPN-r16)) OF CAG-Identity-r16
    },
    snpn-r16                        SEQUENCE {
        plmn-Identity                   PLMN-Identity,
        nid-List-r16                    SEQUENCE (SIZE (1..maxNPN-r16)) OF NID-r16
    }
}
```

FIG. 1

```
NPN-Identity-r16 ::=            CHOICE {
    pni-npn-r16                     SEQUENCE {
        plmn-Identity-r16               PLMN-Identity,
        cag-IdentityList-r16            SEQUENCE (SIZE (1..maxNPN-r16)) OF CAG-IdentityInfo-r16
    },
    snpn-r16                        SEQUENCE {
        plmn-Identity                   PLMN-Identity,
        nid-List-r16                    SEQUENCE (SIZE (1..maxNPN-r16)) OF NID-r16
    }
}

CAG-IdentityInfo-r16 ::=        SEQUENCE {
    CAG-Identity-r16                BIT STRING (SIZE (32)),
    manualCAGselectionAllowed-r16   BOOLEAN
}
```

FIG. 2

```
SIB10-r16 ::=              SEQUENCE {
    hrnn-List-r16                       HRNN-List-r16                          OPTIONAL,   -- Need R
    manualCAGselectionAllowed-List-r16  ManualCAGselectionAllowed-List-r16     OPTIONAL,   -- Need R
    lateNonCriticalExtension            OCTET STRING                           OPTIONAL,
    ...
}

HRNN-List-r16 ::=          SEQUENCE (SIZE (1..maxNPN-r16)) OF HRNN-r16

ManualCAGselectionAllowed-List-r16 ::= SEQUENCE (SIZE(1..maxNPN-r16)) OF ManualCAGselectionAllowed-
r16

HRNN-r16 ::=               SEQUENCE {
    hrnn-r16                    OCTET STRING (SIZE(1.. maxHRNN-Len-r16))   OPTIONAL    -- Need R
}

ManualCAGselectionAllowed-r16 ::= SEQUENCE {
    manualCAGselectionAllowed-r16 ::=   ENUMERATED {allowed}                OPTIONAL    -- Need R
}
```

FIG. 3

```
SIB10-r16 ::=                    SEQUENCE {
    hrnn-List-r16                            HRNN-List-r16                   OPTIONAL,   -- Need R
    manualCAGselectionAllowed-r16 ::=        ENUMERATED {allowed}            OPTIONAL,   -- Need R
    lateNonCriticalExtension                 OCTET STRING                    OPTIONAL,
    ...
}

HRNN-List-r16 ::=                SEQUENCE (SIZE (1..maxNPN-r16)) OF HRNN-r16
HRNN-r16 ::=                     SEQUENCE {
    hrnn-r16                         OCTET STRING (SIZE(1.. maxHRNN-Len-r16))   OPTIONAL   -- Need R
}
```

FIG. 4

METHOD OF PERFORMING CLOSED ACCESS GROUP SELECTION IN NON-PUBLIC NETWORK AND RELATED DEVICE

CROSS-REFERENCE TO RELATED APPLICATION(S)

The present disclosure claims the benefit of and priority to U.S. Provisional Patent Application Ser. No. 63/033,130 filed on Jun. 1, 2020, entitled "METHOD AND APPARATUS FOR NETWORK-CONTROLLED MANUAL CAG SELECTION IN NON-PUBLIC NETWORK," (hereinafter referred to as "the '130 provisional"). The disclosure of the '130 provisional is hereby incorporated fully by reference into the present disclosure.

FIELD

The present disclosure is generally related to wireless communications and, more specifically, to a method of performing a closed access group (CAG) selection in a non-public network (NPN) and a related device.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability for optimizing the network services and types and accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of performing a closed access group (CAG) selection in a non-public network (NPN) and a related device.

According to an aspect of the present disclosure, a method of performing a CAG selection in an NPN for a user equipment (UE) is provided. The method includes receiving, from a CAG cell, a first indication and a CAG identity via a System Information Block 1 (SIB1), reporting, by an Access Stratum (AS) layer of the UE, to a Non-Access Stratum (NAS) layer of the UE, the first indication and the CAG identity when a request from the NAS layer is received, and performing a cell selection or reselection procedure according to the CAG identity, wherein the first indication is associated with the CAG identity and indicates that the CAG identity is allowed to be selected manually even if the CAG identity is not included in an allowed CAG list of the UE.

According to another aspect of the present disclosure, a UE for performing CAG selection in an NPN is provided. The UE includes a processor configured to execute a computer-executable program, and a memory coupled to the processor and configured to store the computer-executable program, wherein the computer-executable program instructs the processor to perform the above-described method of performing the CAG selection in an NPN.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

FIG. 1 is a schematic diagram illustrating a public land mobile network (PLMN) indication, according to an implementation of the present disclosure.

FIG. 2 is a schematic diagram illustrating a closed access group (CAG) indication, according to an implementation of the present disclosure.

FIG. 3 is a schematic diagram illustrating an entry of a Human Readable Network Name (HRNN) list, according to an implementation of the present disclosure.

FIG. 4 is a schematic diagram illustrating an HRNN list, according to an implementation of the present disclosure.

DESCRIPTION

Figure 5:
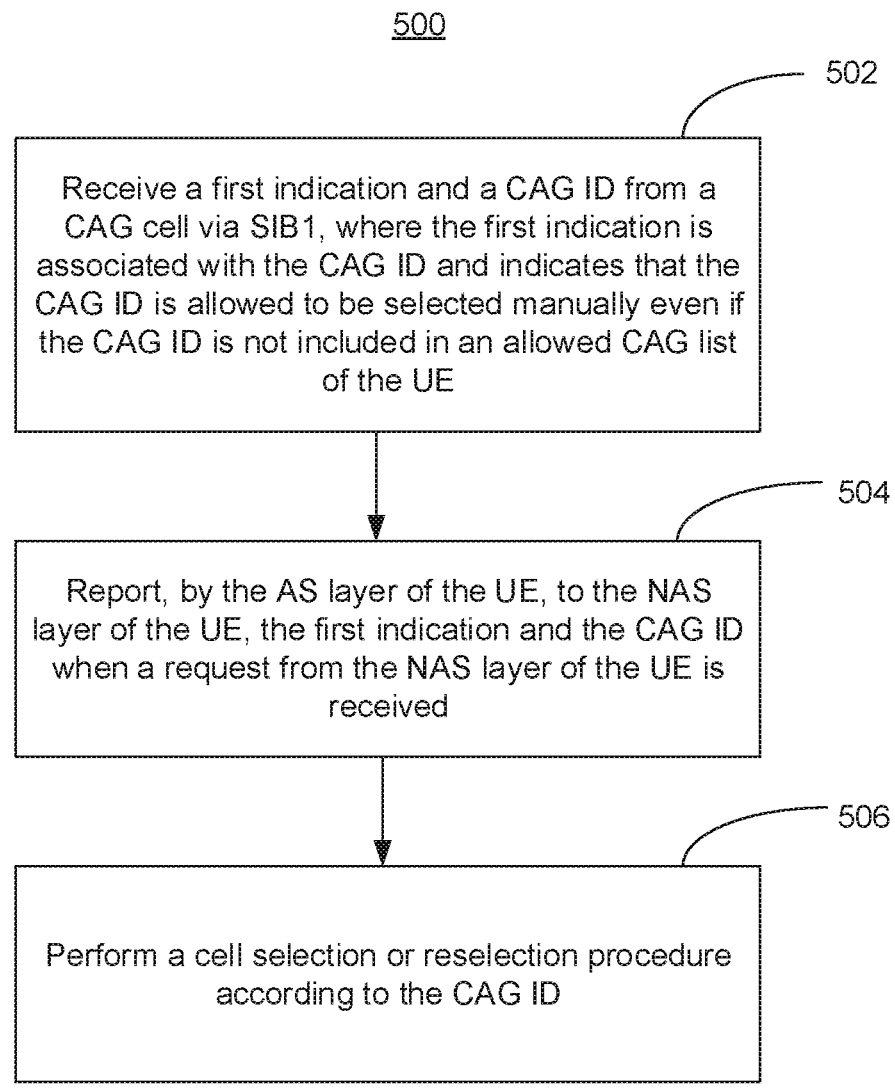
FIG. 5 is a flowchart illustrating a method of performing a closed access group (CAG) selection in a non-public network (NPN), according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "In one embodiment", "In one implementation", "In one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE according to the present disclosure may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are applied for NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

In order to fulfill the low latency and high reliability requirements for the vertical industry and support the 5G Local Area Network (LAN) type service, a dedicated wireless network (e.g., private network) attracts attention to be included in the next-generation cellular network.

The private network (e.g., non-public network (NPN)) may support the vertical industry and LAN services. The private network may be classified into a single non-public network (SNPN) and a public network integrated non-public network (PNI-NPN).

The 5G system is enhanced to support NPN. Two network identifies are applied for NPN: Non-public network ID (NID) and Closed Access Group (CAG) ID. 5G Radio Access Network (RAN) may also implement NPN by enhancing features such as NPN identification, discovery, selection/reselection, access control, and mobility restrictions.

In an NPN scenario, a UE may be configured as "a UE in SNPN access mode" or "a UE in non-SNPN access mode (e.g., a UE not in SNPN access mode)" by the NAS layer of the UE, by the camped/serving cell, or by pre-configuration. On the other hand, a cell may be configured as "an SNPN cell", "a CAG cell", "a public land mobile network (PLMN) cell", "a cell supporting at least SNPN deployments", "a cell supporting at least PNI-NPN deployments", "a cell supporting at least PLMN deployments", "a cell supporting at least SNPN and PNI-NPN deployments", "a cell supporting at least SNPN and PLMN deployments", "a cell supporting at least PNI-NPN and PLMN deployments", or "a cell supporting SNPN, PNI-NPN and PLMN deployments".

An NPN-capable UE may (re)select a CAG cell based on an automatic CAG selection method and a manual CAG selection method. The manual CAG selection method may include network-controlled manual CAG selection (e.g., PLMN-controlled manual CAG selection) by which a PLMN is able to control a UE manually selecting an NPN hosted by this PLMN that the UE is not authorized to select automatically. It is noted that the automatic CAG selection method and the manual CAG selection method may be predefined/default functions or instructions executed by the UE. In this disclosure, the UE in the automatic CAG selection mode performs the automatic CAG selection, in the manual CAG selection mode performs the manual CAG selection, and in the network-controlled manual CAG selection mode performs network-controlled manual CAG selection.

For the network-controlled manual CAG selection, some aspects are considered as follows: (1) an indication for a RAN (e.g., a CAG cell) to broadcast that the PLMN allows a UE in the network-controlled manual CAG selection mode to manually select a CAG ID supported by the CAG cell, (2) UE behavior upon receiving the indication (e.g., via SIB1, via SIB10), and (3) the definition of a suitable cell.

If the UE supports CAG (or NPN), the UE may be configured (or provisioned) with a CAG information list, consisting of zero or more entries, each including:
  (a) a PLMN ID;
  (b) an allowed CAG list, which may contain zero or more CAG IDs; and
  (c) an optional "indication that the UE is only allowed to access 5G System (5GS) via CAG cell".

The CAG information list is stored in the Mobile Equipment (ME). If the UE supports CAG (or NPN) and is configured (or provisioned) with a non-empty CAG information list, the UE may perform a CAG selection. If the UE supports CAG (or NPN) but is configured (or provisioned) with an empty CAG information list, the UE may perform a CAG selection (e.g., network-controlled manual CAG selection).

The Non-Access Stratum (NAS) layer of the UE may provide the Access Stratum (AS) layer of the UE with a CAG information list if the CAG information list is available. If the contents of the CAG information list have changed, the NAS layer of the UE may provide an updated CAG information list to the AS layer of the UE.

The CAG selection can be classified into three approaches: (1) automatic CAG selection, (2) manual CAG selection, and (3) network-controlled manual CAG selection.

Automatic CAG Selection

The automatic CAG selection may utilize the allowed CAG list. After a PLMN is selected, the UE may camp on a cell in that PLMN only if either the cell is not a CAG cell or is a CAG cell with a CAG identity that is in the allowed CAG list.

In other words, if a PLMN is selected and an entry in the CAG information list that includes a PLMN ID corresponding to the identity of the selected PLMN and an allowed CAG list containing a CAG ID broadcast by the cell on which the UE is camping, the UE may consider the CAG ID as the selected CAG ID. In this case, if the allowed CAG list contains more than one CAG ID broadcast by the cell on which the UE is camping, the UE may select one of those CAG IDs based on UE implementation.

If the UE supports CAG (or NPN) and is configured with a non-empty CAG information list, the UE may consider a PLMN indicated by a Next Generation RAN (NG-RAN) (e.g., cell, network (NW)) when the following condition (1) or condition (2) is satisfied.

Condition (1): The cell is a CAG cell and broadcasts a CAG ID for the PLMN such that an entry with the PLMN ID of the PLMN exists in the CAG information list and the CAG ID is included in the allowed CAG list of the entry.

Condition (2): The cell is not a CAG cell and no entry with the PLMN ID of the PLMN exists in the CAG information list, or the cell is not a CAG cell and an entry with the PLMN ID of the PLMN exists in the CAG information list, but the "indication that the UE (or Mobile Station (MS)) is only allowed to access 5GS via CAG cells" is not included in (or is absent in) the entry.

Manual CAG Selection

If the UE supports CAG (or NPN) and is configured with a non-empty CAG information list, for each PLMN or access technology combination of NG-RAN access technology, the UE may notify (or present) the PLMN or access technology combination and a list of CAG IDs composed of one or more CAG IDs to the user such that each CAG ID satisfies (1) an available CAG cell that broadcasts the CAG ID for the PLMN and (2) an entry with the PLMN ID of the PLMN existing in the CAG information list and the CAG ID being included in the allowed CAG list of the entry.

If the UE supports CAG (or NPN) and is configured (or provisioned) with a non-empty CAG information list, for each PLMN or access technology combination of NG-RAN access technology, the UE may notify (or present) the PLMN/access technology combination without a list of CAG IDs to the user if there is an available NG-RAN cell that is not a CAG cell for the PLMN.

If the UE supports CAG (or NPN) and is configured (or provisioned) with a non-empty CAG information list, for each PLMN or access technology combination of NG-RAN access technology, the UE may not notify (or may not present) the PLMN or access technology combination to the user if there is no available NG-RAN cell that is not a CAG cell for the PLMN and if there is no CAG ID satisfying (1) an available CAG cell that broadcasts the CAG ID for the PLMN and (2) an entry with the PLMN ID of the PLMN existing in the CAG information list and the CAG ID being included in the allowed CAG list of the entry.

When the UE selects a PLMN and a CAG ID (e.g., a UE's desired CAG ID), the UE may initiate a registration on this PLMN (and on a cell (e.g., as a suitable cell) that broadcasts the CAG ID) by the access technology chosen by the UE for that PLMN or by using the highest priority available access technology for that PLMN, if the associated access technologies have a priority order. The UE may initiate a registration on this PLMN by initiating a registration procedure via the camped/serving cell (e.g., as a suitable cell) to the core network. For example, the UE may initiate the registration procedure by transmitting a registration request message (e.g., a NAS signaling) included in a Radio Resource Control (RRC) message (e.g., RRC (Connection) Setup Complete message) via the camped/serving cell to the Access and Mobility Management Function (AMF) in the core network. The camped/serving cell is the recipient of the RRC message, and the AMF in the core network is the recipient of the registration request message.

Network-Controlled Manual CAG Selection

The 5G system may support a mechanism for a PLMN to control whether a UE can manually select an NPN hosted by this PLMN that the UE is not authorized to select automatically.

Several conditions for a UE to apply a broadcast indication (e.g., a PLMN indication, a CAG indication, and/or an indication in SIB10) indicating that a PLMN allows the UE to manually select a CAG ID supported by the CAG cell are disclosed.

Condition 1: If the AS layer of the UE receives an indicator from the NAS layer of the UE to apply the broadcast indication for the network-controlled manual CAG selection, the UE may determine whether to apply the broadcast indication for the network-controlled manual CAG selection based on the received indicator.

In one example, the AS layer of the UE may receive the indicator together with an allowed CAG list from the NAS layer of the UE.

In one example, if the AS layer of the UE receives the indicator from the NAS layer of the UE, the UE may apply the broadcast indication for the network-controlled manual CAG selection.

In one example, if the AS layer of the UE does not receive the indicator from the NAS layer of the UE, the UE may not apply the broadcast indication (e.g., the UE may ignore the PLMN indication, the CAG indication, and/or an indication in SIB10).

In one example, if the AS layer of the UE receives the indicator from the NAS layer of the UE, the UE may further determine whether to apply the broadcast indication based on some criteria (e.g., the UE's mode, whether the broadcast indication for the network-controlled manual CAG selection is broadcast, the UE's RRC state (e.g., RRC_IDLE, RRC_INACITVE, RRC_CONNECTED)). The UE's mode may include the automatic CAG selection mode, the manual CAG selection mode, and the network-controlled manual CAG selection mode. The broadcast indication may include a PLMN indication, a CAG indication, and/or an indication in SIB10.

Condition 2: The UE may determine whether to apply the broadcast indication for the network-controlled manual CAG selection based on the UE's mode or any mode combination (e.g., the automatic CAG selection mode, the manual CAG selection mode, and/or the network-controlled manual CAG selection mode).

In one example, if the UE is in the automatic CAG selection mode, the UE may or may not ignore the broadcast indication from a serving/camped cell.

In one example, if the UE is in the manual CAG selection mode, the UE may or may not ignore the broadcast indication from the serving/camped cell.

In one example, if the UE is in the network-controlled manual CAG selection mode, the UE may not ignore the broadcast indication from the serving/camped cell.

Condition 3: The UE may apply the broadcast indication for the network-controlled manual CAG selection regardless of the UE's mode (e.g., the automatic CAG selection mode, the manual CAG selection mode, or the network-controlled manual CAG selection mode). That is, the UE may (by default, or mandatorily) apply the broadcast indication for the network-controlled manual CAG selection.

In one example, the UE may perform the network-controlled manual CAG selection based on whether the broadcast indication that the PLMN allows the UE to manually select a CAG ID supported by the CAG cell is broadcast by the serving/camped cell.

In one example, if the broadcast indication is broadcast (or specified), the UE (e.g., in the automatic CAG selection mode, the manual CAG selection mode, or the network-controlled manual CAG selection mode) may apply the broadcast indication.

In one example, if the broadcast indication is absent (or not broadcast), the UE (e.g., in the automatic CAG selection mode, the manual CAG selection mode, or the network-controlled manual CAG selection mode) may not apply the broadcast indication.

PLMN Indication

The CAG cell may broadcast (e.g., via SIB1, SIB10, or other system information (SI)) an indication that is associated with a PLMN ID (namely the PLMN indication) in a PNI-NPN information element (IE). The PNI-NPN information element may indicate an identity and information related to a PNI-NPN. The PNI-NPN information element may include a PLMN ID and a list of CAG ID(s) associated with the PLMN ID. The PNI-NPN information element may be one choice of an NPN identity information element. For example, as illustrated in FIG. 1, the indication (e.g., manualCAGselectionAllowed-r16 IE in FIG. 1) is associated with a PLMN ID (e.g., plmn-Identity IE) and/or associated with a list of CAG ID(s) (e.g., cag-IdentityList IE).

The indication may be a Boolean indicator (e.g., ENUMERATED{true}, ENUMERATED{true, false}, ENUMERATED{enabled}, ENUMERATED{enabled, disabled}, ENUMERATED{allowed}, or ENUMERATED {allowed, not allowed}).

If the indication is a Boolean indicator set to '1', 'true', 'enabled', or 'allowed', the UE (e.g., especially an NPN-capable UE configured with the allowed CAG list) with the selected/registered PLMN corresponding to the PLMN ID that is associated with the indication may perform at least one of the following actions:

Action 1: The UE may determine the cell broadcasting the indication as a candidate CAG cell for cell (re)selection;

Action 2: The UE may determine the cell broadcasting the indication as a candidate CAG cell for cell (re)selection if the broadcast CAG ID(s) in the broadcast CAG ID list (e.g., cag-IdentityList IE) is in the UE's allowed CAG list; and Action 3: The UE may determine the cell broadcasting such indication as a candidate CAG cell for cell (re)selection if the broadcast CAG ID(s) in the broadcast CAG ID list (e.g., cag-IdentityList IE) is not in the UE's allowed CAG list.

If the indication is a Boolean indicator set to '0', 'false', 'disabled', or 'not allowed', or if the indication is absent, the UE (e.g., especially an NPN-capable UE configured (or provisioned) with the allowed CAG list) with the selected/registered PLMN corresponding to the PLMN ID that is associated with the indication may perform at least one of the following actions:

Action 1: The UE may or may not determine the cell broadcasting the indication as a candidate CAG cell for cell (re)selection;

Action 2: The UE may determine the cell broadcasting the indication as a candidate CAG cell for cell (re)selection if the broadcast CAG ID(s) in the broadcast CAG ID list (e.g., cag-IdentityList IE) is in the UE's allowed CAG list; and Action 3: The UE may not determine the cell broadcasting the indication as a candidate CAG cell for cell (re)selection if the broadcast CAG ID(s) in the broadcast CAG ID list (e.g., cag-IdentityList IE) is not in the UE's allowed CAG list.

Moreover, if the UE determines the cell broadcasting the indication as a candidate CAG cell for cell (re)selection, the AS layer of the UE may report the CAG ID(s)/PLMN ID(s) associated with the indication and broadcast by the candidate CAG cell to the NAS layer of the UE. The NAS layer of the UE may select a CAG ID based on the received CAG ID(s) from the AS layer of the UE. The NAS layer of the UE may report the selected CAG ID to the AS layer of the UE. The AS layer of the UE may perform cell (re)selection based on the selected CAG ID.

On the other hand, if the UE does not determine the cell broadcasting the indication as a candidate CAG cell for cell (re)selection, the AS layer of the UE may not report the CAG ID(s)/PLMN ID(s) associated with the indication and broadcast by the candidate CAG cell to the NAS layer of the UE.

The UE (e.g., in RRC_IDLE state, in RRC_INACTIVE state, or in RRC_CONNECTED state while a timer T311 is running, where the UE may state the timer T311 if an RRC connection reestablishment procedure is triggered) may check the indication (e.g., manualCAGselectionAllowed-r16 IE in FIG. 1) broadcast by the cell when the UE receives the SIB1 and if the UE supports a downlink channel bandwidth with a maximum transmission bandwidth configuration that is smaller than or equal to the carrierBandwidth (indicated in downlinkConfigCommon IE for the Sub-Carrier Spacing (SCS) of the initial downlink bandwidth part (BWP)), and is wider than or equal to the bandwidth of the initial downlink BWP. Based on the check result of the indication, the AS layer of the UE may forward/report the CAG ID(s)/PLMN ID(s) associated with the indication to the upper layer (e.g., NAS layer) of the UE. The AS layer of the UE may include the physical (PHY) layer, Medium Access Control (MAC) layer, Radio Link Control (RLC) layer, Packet Data Convergence Protocol (PDCP) layer, RRC layer, or Service Data Adaptation Protocol (SDAP) layer of the UE.

In one example, if the UE is configured to perform the automatic CAG selection, the UE may ignore (or may not check) the indication (e.g., manualCAGselectionAllowed-r16 IE in FIG. 1) associated with the selected/registered PLMN. The AS layer of the UE may forward/report the CAG ID(s)/PLMN ID(s) (associated with the indication) to the upper layer (e.g., NAS layer) of the UE.

In one example, if the UE is configured to perform the manual CAG selection (e.g., the NAS layer of the UE may provide a request for searching available CAG(s) operating nearby cells to the AS layer of the UE and evaluate a report about available CAG(s) operating nearby cells for the manual CAG selection from the AS layer of the UE, where the available CAG(s) may be identified by the CAG ID(s) broadcast by the nearby cells), the UE may ignore (or may not check) the indication (e.g., manualCAGselectionAllowed-r16 IE in FIG. 1) associated with the selected/registered PLMN. The AS layer (e.g., RRC layer) of the UE may forward/report the CAG ID(s)/PLMN ID(s) (associated with the indication) to the upper layer (e.g., NAS layer) of the UE.

In one example, if the UE is configured to perform the manual CAG selection, the UE may check the indication (e.g., manualCAGselectionAllowed-r16 IE in FIG. 1) associated with the selected/registered PLMN.

If the indication is a Boolean indicator set to '1', 'true', 'enabled', or 'allowed', the AS layer (e.g., RRC layer) of the UE may forward/report the CAG ID(s)/PLMN ID(s) associated with the indication to the upper layer (e.g., NAS layer) of the UE (without checking whether the CAG ID is included in the UE's allowed CAG list).

If the indication is a Boolean indicator set to '0', 'false', 'disabled', or 'not allowed', or is absent, the AS layer (e.g., RRC layer) of the UE may not forward/report the CAG ID(s)/PLMN ID(s) associated with the indication to the upper layer (e.g., NAS layer).

If the indication is a Boolean indicator set to '0', 'false', 'disabled', or 'not allowed', or is absent, the AS layer (e.g., RRC layer) of the UE may further check whether the CAG ID associated with PLMN ID, where the PLMN ID is associated with the indication, is in the UE's allowed CAG list. For example, if the CAG ID associated with PLMN ID, where the PLMN ID is associated with the indication, is in the UE's allowed CAG list, the AS layer (e.g., RRC layer) of the UE may forward/report the CAG ID/PLMN ID(s) associated with the indication to the upper layer (e.g., NAS layer) of the UE. On the other hand, if the CAG ID associated with PLMN ID, where the PLMN ID is associated with the indication, is not in the UE's allowed CAG list, the AS layer (e.g., RRC layer) of the UE may not forward/report the CAG ID/PLMN ID(s) associated with the indication to the NAS layer of the UE.

In one example, if the UE is configured to perform the network-controlled manual CAG selection, the UE may check the indication (e.g., manualCAGselectionAllowed-r16 IE in FIG. 1) associated with the selected/registered PLMN.

If the indication is a Boolean indicator set to '1', 'true', 'enabled', or 'allowed', the AS layer (e.g., RRC layer) of the UE may forward/report the CAG ID(s)/PLMN ID(s) associated with the indication to the upper layer (e.g., NAS layer) of the UE (without checking whether the CAG ID(s) is included in the UE's allowed CAG list).

If the indication is a Boolean indicator set to '0', 'false', 'disabled', or 'not allowed', or is absent, the AS layer (e.g., RRC layer) of the UE may not forward/report the CAG ID(s)/PLMN ID(s) associated with the indication to the upper layer (e.g., NAS layer) of the UE.

If the indication is a Boolean indicator set to '0', 'false', 'disabled', or 'not allowed', or is absent, the AS layer (e.g., RRC layer) of the UE may further check whether the CAG ID associated with PLMN ID, where the PLMN ID is associated with the indication, is in the UE's allowed CAG list. For example, if the CAG ID associated with PLMN ID, where the PLMN ID is associated with the indication, is in the UE's allowed CAG list, the AS layer (e.g., RRC layer) of the UE may forward/report the CAG ID/PLMN ID(s) associated with the indication to the upper layer (e.g., NAS layer) of the UE. On the other hand, if the CAG ID associated with PLMN ID, where the PLMN ID is associated with the indication, is not in the UE's allowed CAG list, the AS layer (e.g., RRC layer) of the UE may not forward/report the CAG ID/PLMN ID(s) associated with the indication to the upper layer (e.g., NAS layer) of the UE.

Moreover, when the UE receives and reads the SIB1, the UE may further check whether SIB10 is (being) broadcast by checking si-BroadcastStatus IE and the associated sib-MappingInfo IE in the SI-SchedulingInfo IE and/or check whether SIB10 is an area-specific SIB (e.g., if type is 'SIB10' and areaScope is 'true' in SIB-TypeInfo IE in the SI-SchedulingInfo IE, SIB10 may be an area-specific SIB; otherwise, SIB10 may be a cell-specific SIB), and/or check whether a stored SIB10 is valid based on a value tag in SIB-TypeInfo IE, with the type being 'SIB10'. If SIB10 (e.g., an NPN-specific SIB) is included in sib-MappingInfo IE and the associated si-BroadcastStatus IE is 'broadcasting', and/or if the stored SIB10 (if existing) is not valid because the value tag associated with the stored SIB10 is different from the received value tag in SIB10, the UE may further receive the Human Readable Network Name (HRNN) list via SIB10, where the entry of the HRNN list may correspond to the NPN identity (an SNPN identity, a PNI-NPN identity, a combination of a PLMN identity and a CAG identity, or a combination of a PLMN identity and CAG identities that associate with the PLMN identity) broadcast in SIB1 (e.g., especially in cellAccessRelatedInfo IE in SIB1). The amount of HRNN(s) in the HRNN list is the same as the number of NPN(s) (e.g., the amount of NPN identities, the amount of SNPN identities, the amount of the combinations of a PLMN identity and a CAG identity, or the number of combinations of a PLMN identity and CAG identities that associate with the PLMN identity) in SIB1. The n-th entry of the HRNN list may contain the HRNN of the n-th NPN (identity) in SIB1. The corresponding entry in HRNN-List is absent (or null) if there is no HRNN associated with the given NPN. If the si-BroadcastStatus IE associated with SIB10 is 'broadcasting', and/or if the stored SIB10 (if existing) is not valid because the value tag associated with the stored SIB10 is different from the received value tag in SIB1, the UE (e.g., an NPN-capable UE) may receive the SIB10 and acquire the HRNN(s) if any. The UE may further check and/or receive the HRNN associated with the NPN identity including the PLMN identity and/or CAG identity, where the PLMN identity and/or CAG identity included in the NPN identity may associate to the indication (e.g., manualCAGselectionAllowed-r16 IE in FIG. 1). If the stored SIB10 (if existing) is valid because the value tag associated with the stored SIB10 is the same as the received value tag in SIB1, the UE may apply the stored HRNN associated with the NPN identity, including the PLMN identity and/or CAG identity, where the PLMN identity and/or CAG identity included in the NPN identity may associate to the indication (e.g., manualCAGselection-Allowed-r16 IE in FIG. 1). If SIB10 (e.g., an NPN-specific SIB) is included in sib-MappingInfo IE and the associated si-BroadcastStatus IE is 'notbroadcasting', and/or if the stored SIB10 (if existing) is not valid because the value tag associated with the stored SIB10 is different from the received value tag in SIB10, the UE may further request SIB10 based on a 2-step random access (RA) procedure by transmitting a preamble to the serving/camped cell or a 4-step RA procedure by transmitting an RRC message (e.g., RRC System Information Request message) to the serving/camped cell.

In one example, if the UE is configured to perform the automatic CAG selection, the UE may ignore (or may not check) the indication (e.g., manualCAGselectionAllowed-r16 IE in FIG. 1) associated with the selected/registered PLMN. If the UE checks and/or receives the HRNN via SIB10 where the HRNN associates with the NPN identity in SIB1, the AS layer (e.g., RRC layer) of the UE may forward/report the CAG ID(s)/PLMN ID(s) (associated with the indication) and the (received and associated) HRNN to the upper layer (e.g., NAS layer) of the UE. If the UE checks the SIB10 (e.g., a stored SIB10 or a newly received SIB10) but does not receive the HRNN via SIB10, where the HRNN associates with the NPN identity in SIB1 (e.g., the entry of the HRNN list corresponds to the NPN identity in SIB1 is absent/empty), the AS layer (e.g., RRC layer) of the UE may forward/report the CAG ID(s)/PLMN ID(s) (associated with the indication) without the HRNN to the upper layer (e.g., NAS layer) of the UE.

In one example, if the UE is configured to perform the manual CAG selection (e.g., the NAS of the UE may provide a request for searching available CAG(s) operating the nearby cells to the AS layer of the UE and evaluate a report about available CAG(s) operating the nearby cells for the manual CAG selection from the AS layer of the UE), the UE may ignore (or may not check) the indication (e.g., manualCAGselectionAllowed-r16 IE in FIG. 1) associated with the selected/registered PLMN. If the UE checks and/or receives the HRNN via SIB10, where the HRNN associates with the NPN identity in SIB1, the AS layer (e.g., RRC layer) of the UE may forward/report the CAG ID(s)/PLMN ID(s) (associated with the indication) and the (received and associated) HRNN to the upper layer (e.g., NAS layer) of the UE. If the UE checks the SIB10 (e.g., a stored SIB10 or a newly received SIB10) but does not receive the HRNN via SIB10 where the HRNN associates with the NPN identity in SIB1 (e.g., the entry of the HRNN list corresponding to the NPN identity in SIB1 is absent/empty), the AS layer of the UE may forward/report the CAG ID(s)/PLMN ID(s) (associated with the indication) without the HRNN to the upper layer (e.g., NAS layer) of the UE.

In one example, if the UE is configured to perform the manual CAG selection, the UE may check the indication (e.g., manualCAGselectionAllowed-r16 IE in FIG. 1) associated with the selected/registered PLMN.

If the indication is a Boolean indicator set to '1', 'true', 'enabled', or 'allowed', the AS layer (e.g., RRC layer) of the UE may forward/report the CAG ID(s)/PLMN ID(s) associated with the indication to the upper layer (e.g., NAS layer) of the UE (without checking whether the CAG ID(s) is included in the UE's allowed CAG list). The UE may further check whether SIB10 is (being) broadcast by the cell based on si-BroadcastStatus IE and the associated sib-MappingInfo IE. If the UE checks and/or receives the HRNN via SIB10, where the HRNN associates with the NPN identity in SIB1, the AS layer (e.g., RRC layer) of the UE may forward/report the CAG ID(s)/PLMN ID(s) (associated with the indication) and the (received and associated) HRNN to the upper layer (e.g., NAS layer). If the UE checks the SIB10 (e.g., a stored SIB10, a newly received SIB10) but does not receive the HRNN via SIB10, where the HRNN associates with the NPN identity in SIB1 (e.g., the entry of the HRNN list corresponding to the NPN identity in SIB1 is absent/empty), the AS layer (e.g., RRC layer) of the UE may forward/report the CAG ID(s)/PLMN ID(s) (associated with the indication) without the HRNN to the upper layer (e.g., NAS layer) of the UE.

If the indication is a Boolean indicator set to '0', 'false', 'disabled', or 'not allowed', or is absent, the AS layer (e.g., RRC layer) of the UE may not forward/report the CAG ID(s)/PLMN ID(s) associated with the indication to the upper layer (e.g., NAS layer) of the UE. The UE may not check whether SIB10 is (being) broadcast by the cell based on si-BroadcastStatus IE and the associated sib-MappingInfo IE.

In one example, if the UE is configured to perform the network-controlled manual CAG selection, the UE may check the indication (e.g., manualCAGselectionAllowed-r16 IE in FIG. 1) associated with the selected/registered PLMN.

If the indication is a Boolean indicator set to '1', 'true', 'enabled', or 'allowed', the AS layer of the UE (e.g., RRC layer) may forward/report the CAG ID(s)/PLMN ID(s) associated with the indication to the upper layer (e.g., NAS layer) of the UE (without checking whether the CAG ID(s) is included in the UE's allowed CAG list). The UE may further check whether SIB10 is (being) broadcast by the cell based on si-BroadcastStatus IE and the associated sib-MappingInfo IE. If the UE checks and/or receives the HRNN via SIB10, where the HRNN associates with the NPN identity in SIB1, the AS layer of the UE may forward/report the CAG ID(s)/PLMN ID(s) (associated with the indication) and the (received and associated) HRNN to the upper layer (e.g., NAS layer) of the UE. If the UE checks the SIB10 (e.g., a stored SIB10 or a newly received SIB10) but does not receive the HRNN in SIB10 where the HRNN associates with the NPN identity in SIB1 (e.g., the entry of the HRNN list corresponding to the NPN identity in SIB1 is absent/empty), the AS layer (e.g., RRC layer) of the UE may forward/report the CAG ID(s)/PLMN ID(s) (associated with the indication) without the HRNN to the upper layer (e.g., NAS layer) of the UE.

If the indication is a Boolean indicator set to '0', 'false', 'disabled', or 'not allowed', or is absent, the AS layer (e.g., RRC layer) of the UE may not forward/report the CAG ID(s)/PLMN ID(s) associated with the indication to the upper layer (e.g., NAS layer) of the UE. The UE may not check whether SIB10 is (being) broadcast by the cell based on si-BroadcastStatus IE and the associated sib-MappingInfo IE.

CAG Indication

The CAG cell may broadcast (e.g., via SIB1, SIB10, or other SI) an indication that is associated with a CAG ID (namely, the CAG indication) in the PNI-NPN information element. The PNI-NPN information element may indicate an identity and information related to a PNI-NPN. The PNI-NPN information element may include a PLMN ID and a list of CAG ID(s) associated with the PLMN ID. The PNI-NPN information element may be one choice of an NPN identity information element. For example, as illustrated in FIG. 2, the indication (e.g., manualCAGselectionAllowed-r16 IE in FIG. 2) is associated with a CAG ID (e.g., CAG-Identity IE). If PNI-NPN information element includes a PLMN ID and a list of CAG ID(s), each CAG ID in the list of CAG ID(s) may be associated with the indication.

The indication may be a Boolean indicator (e.g., ENUMERATED{true}, ENUMERATED{true, false}, ENUMERATED{enabled}, ENUMERATED{enabled, disabled}, ENUMERATED{allowed}, or ENUMERATED{allowed, not allowed}).

If the indication is a Boolean indicator set to '1', 'true', 'enabled', or 'allowed', the UE (e.g., especially an NPN-capable UE configured with the allowed CAG list) with the selected/registered PLMN corresponding to the PLMN ID associated with the CAG ID with which the indication associates may perform at least one of the following actions:

Action 1: The UE may determine the cell broadcasting the indication as a candidate CAG cell for cell (re)selection;

Action 2: The UE may determine the cell broadcasting the indication as a candidate CAG cell for cell (re)selection if the broadcast CAG ID associated with the indication in the broadcast CAG ID list (e.g., cag-IdentityList IE) is in the UE's allowed CAG list; and Action 3: The UE may determine the cell broadcasting the indication as a candidate CAG cell for cell (re)selection if the broadcast CAG ID associated with the indication in the broadcast CAG ID list (e.g., cag-IdentityList IE) is not in the UE's allowed CAG list.

If the indication is a Boolean indicator set to '0', 'false', 'disabled', or 'not allowed', or is absent, the UE (e.g., especially an NPN-capable UE configured (or provisioned with) with the allowed CAG list) with the selected/registered PLMN corresponding to the PLMN ID associated with the CAG ID with which the indication associates may perform at least one of the following actions:

Action 1: The UE may or may not determine the cell broadcasting the indication as a candidate CAG cell for cell (re)selection;

Action 2: The UE may determine the cell broadcasting the indication as a candidate CAG cell for cell (re)selection if the broadcast CAG ID associated with the indication in the broadcast CAG ID list (e.g., cag-IdentityList IE) is in the UE's allowed CAG list; and Action 3: The UE may not determine the cell broadcasting the indication as a candidate CAG cell for cell (re)selection if the broadcast CAG ID associated with the indication in the broadcast CAG ID list (e.g., cag-IdentityList IE) is not in the UE's allowed CAG list.

If the UE determines the cell broadcasting the indication as a candidate CAG cell for cell (re)selection, the AS layer of the UE may report at least one CAG ID associated with the corresponding indication (where the indication may be a Boolean indicator set to '1', 'true', 'enabled', or 'allowed', a Boolean '0', 'false', 'disabled', or 'not allowed'; or may be absent) and broadcast by the candidate CAG cell to the NAS layer of the UE. The NAS layer of the UE may select a CAG ID based on the received CAG ID(s) from the AS layer (e.g., RRC layer) of the UE. The NAS layer of the UE reports the selected CAG ID to the AS layer (e.g., RRC layer) of the UE. The AS layer (e.g., RRC layer) of the UE performs cell (re)selection based on the selected CAG ID.

If the UE does not determine the cell broadcasting the indication as a candidate CAG cell for cell (re)selection, the AS layer of the UE may not report any CAG ID associated with the corresponding indication (where the indication may be a Boolean indicator set to '1', 'true', 'enabled', or 'allowed' a Boolean indicator set to '0', 'false', 'disabled', or 'not allowed'; or may be absent) and broadcast by the candidate CAG cell to the NAS layer of the UE.

The UE (e.g., in RRC_IDLE state, in RRC_INACTIVE state, or in RRC_CONNECTED state while a timer T311 is running, where the UE may start the timer T311 if an RRC connection reestablishment procedure is triggered) may check the indication (e.g., manualCAGselectionAllowed-r16 IE in FIG. 2) broadcast by the cell when the UE receives the SIB1 and if the UE supports a downlink channel bandwidth with a maximum transmission bandwidth configuration that is smaller than or equal to the carrierBandwidth (indicated in downlinkConfigCommon IE for the SCS of the initial downlink BWP), and is wider than or equal to the bandwidth of the initial downlink BWP. Based on the check result of the indication, the AS layer (e.g., RRC layer) of the UE may forward/report the CAG ID(s) associated with the corresponding indication to the upper layer (e.g., NAS layer) of the UE.

In one example, if the UE is configured to perform the automatic CAG selection, the UE may ignore (or may not check) the indication (e.g., manualCAGselectionAllowed-r16 IE in FIG. 2) associated with the corresponding CAG ID broadcast by the cell, where the corresponding CAG ID may associate with the UE's selected/registered PLMN. The AS layer (e.g., RRC layer) of the UE may forward/report the CAG ID(s) (associated with the corresponding indication(s)) to the upper layer (e.g., NAS layer) of the UE.

In one example, if the UE is configured to perform the manual CAG selection (e.g., the NAS layer of the UE may provide a request for searching available CAG(s) operating the nearby cells to the AS layer of the UE and evaluate a report about available CAG(s) operating the nearby cells for the manual CAG selection from the AS layer of the UE), the UE may ignore (or may not check) the indication (e.g., manualCAGselectionAllowed-r16 IE in FIG. 2) associated with the corresponding CAG ID broadcast by the cell, where the corresponding CAG ID may associate with the UE's selected/registered PLMN. The AS layer (e.g., RRC layer) of the UE may forward/report the CAG ID(s) (associated with the corresponding indication(s)) to the upper layer (e.g., NAS layer) of the UE.

In one example, if the UE is configured to perform the manual CAG selection, the UE may check the indication (e.g., manualCAGselectionAllowed-r16 IE in FIG. 2) associated with the corresponding CAG ID broadcast by the cell, where the corresponding CAG ID may associate with the UE's selected/registered PLMN.

If the indication is a Boolean indicator set to '1', 'true', 'enabled', or 'allowed', the AS layer (e.g., RRC layer) of the UE may forward/report the CAG ID associated with the indication to the upper layer (e.g., NAS layer) of the UE (without checking whether the CAG ID is included in the UE's allowed CAG list).

If the indication is a Boolean indicator set to '0', 'false', 'disabled', or 'not allowed', or is absent, the AS layer (e.g., RRC layer) of the UE may not forward/report the CAG ID associated with the indication to the upper layer (e.g., NAS layer) of the UE.

If the indication is a Boolean indicator set to '0', 'false', 'disabled', or 'not allowed', or is absent, the AS layer (e.g., RRC layer) of the UE may further check whether the CAG ID associated with the indication is in the UE's allowed CAG List. For example, if the CAG ID associated with the indication is in the UE's allowed CAG list, the AS layer (e.g., RRC layer) of the UE may forward/report the CAG ID associated with the indication to the NAS layer of the UE. On the other hand, if the CAG ID associated with the indication is not in the UE's allowed CAG list, the AS layer (e.g., RRC layer) of the UE may not forward/report the CAG ID associated with the indication to the upper layer (e.g., NAS layer) of the UE.

In one example, if the UE is configured to perform the network-controlled manual CAG selection, the UE may check the indication (e.g., manualCAGselectionAllowed-r16 IE in FIG. 2) associated with the corresponding CAG ID broadcast by the cell, where the corresponding CAG ID may associate to the UE's selected/registered PLMN.

If the indication is a Boolean indicator set to '1', 'true', 'enabled', or 'allowed', the AS layer (e.g., RRC layer) of the UE may forward/report the CAG ID associated with the indication to the upper layer (e.g., NAS layer) of the UE (without checking whether the CAG ID is included in the UE's allowed CAG list).

If the indication is a Boolean indicator set to '0', 'false', 'disabled', or 'not allowed', or is absent, the AS layer (e.g., RRC layer) of the UE may not forward/report the CAG ID associated with the indication to the upper layer (e.g., NAS layer) of the UE.

If the indication is a Boolean indicator set to '0', 'false', 'disabled', or 'not allowed', or is absent, the AS layer (e.g., RRC layer) of the UE may further check whether the CAG ID associated with the indication is in the UE's allowed CAG list of the UE. For example, if the CAG ID associated with the indication is in the UE's allowed CAG list, the AS layer (e.g., RRC layer) of the UE may forward/report the CAG ID associated with the indication to the upper layer (e.g., NAS layer) of the UE. On the other hand, if the CAG ID associated with the indication is not in the UE's allowed CAG list, the AS layer (e.g., RRC layer) of the UE may not forward/report the CAG ID associated with the indication to the upper layer (e.g., NAS layer) of the UE.

When the UE receives and/or reads the SIB1, the UE may further check whether may acquire/receive SIB10 periodically or on-demand. is (being) broadcast by checking si-BroadcastStatus IE and the associated sib-MappingInfo IE in the SI-SchedulingInfo IE and/or check whether SIB10 is an area-specific SIB (e.g., if type is 'SIB10' and areaScope is 'true' in SIB-TypeInfo IE in the SI-SchedulingInfo IE, SIB10 may be an area-specific SIB; otherwise, SIB10 may be a cell-specific SIB), and/or check whether a stored SIB10 is valid based on a value tag in SIB-TypeInfo IE with the type being 'SIB10'. If SIB10 (e.g., an NPN-specific SIB) is included in sib-MappingInfo IE and the associated si-BroadcastStatus IE is 'broadcasting' and/or if the stored SIB10 (if existing) is not valid because the value tag associated with the stored SIB10 is different from the received value tag in SIB10, the UE may further receive the HRNN list via SIB10, where the entry of the HRNN list may correspond to the NPN identity (an SNPN identity, a PNI-NPN identity, a combination of a PLMN identity and a CAG identity, or a combination of a PLMN identity and CAG identities which associate to the PLMN identity) broadcast via SIB1 (e.g., especially in cellAccessRelatedInfo IE in SIB1). The amount of HRNN(s) in the HRNN list is the same as the number of NPN(s) (e.g., the amount of NPN identities, the amount of SNPN identities, the amount of the combinations of a PLMN identity and a CAG identity, or the number of combinations of a PLMN identity and CAG identities that associate with the PLMN identity) in SIB1. The n-th entry of HRNN list may contain the HRNN of the n-th NPN (identity) in SIB1. The corresponding entry in HRNN-List is absent (or null) if there is no HRNN associated with the given NPN. If the si-BroadcastStatus IE associated with SIB10 is 'broadcasting' and/or if the stored SIB10 (if existing) is not valid because the value tag associated with the stored SIB10 is different from the received value tag in SIB1, the UE (e.g., an NPN-capable UE) may receive the SIB10 and acquire the HRNN(s), if any. The UE may further check and/or receive the HRNN associated with the NPN identity including the PLMN identity and/or CAG identity where the PLMN identity and/or CAG identity included in the NPN identity may associate with the indication (e.g., manualCAGselectionAllowed-r16 IE in FIG. 2). If the stored SIB10 (if existing) is valid because the value tag associated with the stored SIB10 is the same as the received value tag in SIB1, the UE may apply the stored HRNN associated with the NPN identity, including the PLMN identity and/or CAG identity, where the PLMN identity and/or CAG identity included in the NPN identity may associate with the indication (e.g., manualCAGselectionAllowed-r16 IE in FIG. 2). If SIB10 (e.g., an NPN-specific SIB) is included in sib-MappingInfo IE and the associated si-BroadcastStatus IE is 'notbroadcasting', and/or if the stored SIB10 (if existing) is not valid because the value tag associated with the stored SIB10 is different from the received value tag in SIB10, the UE may further request SIB10 based on a 2-step RA procedure by transmitting a preamble to the serving/camped cell or a 4-step RA procedure by transmitting an RRC message (e.g., RRC System Information Request message) to the serving/camped cell.

In one example, if the UE is configured to perform the automatic CAG selection, the UE may ignore (or may not check) the indication (e.g., manualCAGselectionAllowed-r16 IE in FIG. 2) associated with the CAG ID where the CAG ID may associate with the selected/registered PLMN. If the UE checks and/or receives the HRNN via SIB10, where the HRNN associates with the NPN identity in SIB1, the AS layer (e.g., RRC layer) of the UE may forward/report the CAG ID(s) (where each CAG ID may associate with the indication) and the (received and associated) HRNN to the upper layer (e.g., NAS layer) of the UE. If the UE checks the SIB10 (e.g., a stored SIB10, a newly received SIB10) but does not receive the HRNN via SIB10, where the HRNN associates with the NPN identity in SIB1 (e.g., the entry of the HRNN list corresponding to the NPN identity in SIB1 is absent/empty), the AS layer (e.g., RRC layer) of the UE may forward/report the CAG ID(s) (where each CAG ID may associate with the indication) without the HRNN to the upper layer (e.g., NAS layer) of the UE.

In one example, if the UE is configured to perform the manual CAG selection (e.g., the NAS layer of the UE may provide a request for searching available CAG(s) operating nearby cells to the AS layer of the UE and evaluate a report about available CAG(s) operating nearby cells for CAG selection from the AS layer of the UE), the UE may ignore (or may not check) the indication (e.g., manualCAGselectionAllowed-r16 IE in FIG. 2) associated with the CAG ID, where the CAG ID may associate with the selected/registered PLMN. If the UE checks and/or receives the HRNN via SIB10, where the HRNN associates with the NPN identity in SIB1, the AS layer (e.g., RRC layer) of the UE may forward/report the CAG ID(s) (where each CAG ID may associate with the indication) and the (received and associated) HRNN to the upper layer (e.g., NAS layer) of the UE. If the UE checks the SIB10 (e.g., a stored SIB10 or a newly received SIB10) but does not receive the HRNN via SIB10, where the HRNN associates with the NPN identity in SIB1 (e.g., the entry of the HRNN list corresponding to the NPN identity in SIB1 is absent/empty), the AS layer (e.g., RRC layer) of the UE may forward/report the CAG ID(s) (where each CAG ID may associate with the indication) without the HRNN to the NAS layer of the UE.

In one example, if the UE is configured to perform the manual CAG selection, the UE may check the indication (e.g., manualCAGselectionAllowed-r16 IE in FIG. 2) associated with the CAG ID, where the CAG ID may associate with the selected/registered PLMN.

If the indication is a Boolean indicator set to '1', 'true', 'enabled', or 'allowed', the AS layer (e.g., RRC layer) of the UE may forward/report the CAG ID(s), where each CAG ID may associate with the corresponding indication, to the upper layer (e.g., NAS layer) of the UE (without checking whether the CAG ID(s) is included in the UE's allowed CAG list). The UE may further check whether SIB10 is (being) broadcast by the cell based on si-BroadcastStatus IE and the associated sib-MappingInfo IE. If the UE checks and/or receives the HRNN via SIB10, where the HRNN associates with the NPN identity in SIB1, the AS layer (e.g., RRC layer) of the UE may forward/report the CAG ID(s) (where each CAG ID may associate with the indication) and the (received and associated) HRNN to the upper layer (e.g., NAS layer) of the UE. If the UE checks the SIB10 (e.g., a stored SIB10 or a newly received SIB10) but does not receive the HRNN via SIB10, where the HRNN associates with the NPN identity in SIB1 (e.g., the entry of the HRNN list corresponding to the NPN identity in SIB1 is absent/empty), the AS layer (e.g., RRC layer) of the UE may forward/report the CAG ID(s) (where each CAG ID may associate with the indication) without the HRNN to the upper layer (e.g., NAS layer) of the UE.

If the indication is a Boolean indicator set to '0', 'false', 'disabled', or 'not allowed', or is absent, the AS layer (e.g., RRC layer) of the UE may not forward/report the CAG ID(s), where each CAG ID may associate with the indication to the upper layer (e.g., NAS layer) of the UE. The UE may not check whether SIB10 is (being) broadcast by the cell based on si-BroadcastStatus IE and the associated sib-MappingInfo IE.

In one example, if the UE is configured to perform the network-controlled manual CAG selection, the UE may check the indication (e.g., manualCAGselectionAllowed-r16 IE in FIG. 2) associated with the CAG ID, where the CAG ID may associate with the selected/registered PLMN.

If the indication is a Boolean indicator set to '1', 'true', 'enabled', or 'allowed', the AS layer (e.g., RRC layer) of the UE may forward/report the CAG ID(s), where each CAG ID may associate with the corresponding indication, to the upper layer (e.g., NAS layer) of the UE (without checking whether the CAG ID(s) is included in the UE's allowed CAG list). The UE may further check whether SIB10 is (being) broadcast by the cell based on si-BroadcastStatus IE and the associated sib-MappingInfo IE. If the UE checks and/or receives the HRNN via SIB10, where the HRNN associates with the NPN identity in SIB1, the AS layer (e.g., RRC layer) of the UE may forward/report the CAG ID(s) (where each CAG ID may associate with the indication) and the (received and associated) HRNN to the upper layer (e.g., NAS layer) of the UE. If the UE checks the SIB10 (e.g., a stored SIB10 or a newly received SIB10) but does not receive the HRNN via SIB10, where the HRNN associates with the NPN identity in SIB1 (e.g., the entry of the HRNN list corresponding to the NPN identity in SIB1 is absent/empty), the AS layer (e.g., RRC layer) of the UE may forward/report the CAG ID(s) (where each CAG ID may associate with the indication) without the HRNN to the upper layer (e.g., NAS layer) of the UE.

If the indication is a Boolean indicator set to '0', 'false', 'disabled', or 'not allowed', or is absent, the AS layer of the UE may not forward/report the CAG ID(s), where each CAG ID may associate with the indication to the NAS layer of the UE. The UE may not check whether SIB10 is (being) broadcast by the cell based on si-BroadcastStatus IE and the associated sib-MappingInfo IE.

Indication in SIB10

The UE (e.g., in RRC_IDLE state, in RRC_INACTIVE state, or in RRC_CONNECTED state) may acquire/receive SIB10 periodically or on-demand. If the cell broadcasts SIB10 periodically, the UE may acquire/receive SIB10 periodically. If the cell does not broadcast SIB10 periodically, and if the UE requires SIB10 (e.g., when the UE performs intra-frequency/inter-frequency/inter-RAT cell (re) selection), the UE may initiate the system information request procedure for the request of SIB10. For example, when the NAS layer of the UE provides an indicator to the AS layer (e.g., RRC layer) of the UE, the UE may acquire SIB10. For example, the UE may acquire SIB10 based on the UE's mode (e.g., the automatic CAG selection mode, the manual CAG selection mode, or the network-controlled manual CAG selection mode) or mode combination. For example, an RRC_IDLE/RRC_INACTIVE UE may initiate the system information request procedure for SIB10 by initiating the 2-step/4-step RA procedure (e.g., for a MSG1-based SI request procedure or a MSG3-based SI request procedure) or by transmitting an RRC message (e.g., RRC System Information Request message) over Signaling Radio Bearer 0 (SRB0) to the serving/camped cell. For another example, an RRC_CONNECTED UE may initiate the system information request procedure for SIB10 by transmitting an RRC message (e.g., Dedicated SIB Request message) over Signaling Radio Bearer 1 (SRB1) to the serving cell. Afterward, the UE may receive/acquire SIB10 on the active BWP configured with common search space configured with the field searchSpaceOtherSystemInformation or via an RRC message (e.g., RRC Reconfiguration message) from the serving cell. The UE may receive SIB10 broadcast or unicast (e.g., via an RRC message) by the cell.

The cell (e.g., a cell supporting at least one of PNI-NPN, SNPN, and PLMN) may transmit in SIB10 including a list of HRNN(s), optionally an indication associated with the list of HRNN(s), and optionally at least of one indication associated to the entry of the list of HRNN(s), to the UE. For example, as illustrated in FIG. 3, SIB10 may include a list of HRNN(s) and a list of indications, where each indication may correspond to one entry of the list of HRNN(s). For another example, as illustrated in FIG. 4, SIB10 may include a list of HRNN(s) and an indication, where the indication may correspond to every entry of the list of HRNN(s). In FIG. 4, SIB10 may include a list of HRNN(s) with an associated indication and another list of HRNN(s) without an associated indication. For example, the entries in the list of HRNN(s) with an associated indication may correspond to PNI-NPN(s) (identified by a pair of a PLMN ID and a CAG ID) and/or CAG(s) (identified by CAG ID(s)). The entries in the list of HRNN(s) without an associated indication may correspond to SNPN(s) (identified by a pair of a PLMN ID and a network ID). It is noted that an entry of the list of HRNN(s) may refer to an NPN identity (e.g., an SNPN identity (i.e., a pair of a PLMN identity and a network identity) or a PNI-NPN identity (i.e., a pair of a PLMN identity and a CAG identity)) broadcast in SIB1.

If SIB10 is not broadcast periodically, or if SIB10 is not broadcasting based on the si-scheludingInfo IE in SIB1, the UE may further request SIB10 from the serving/camped cell (e.g., before the NAS layer of the UE selects a CAG ID (or SNPN ID) during PLMN selection and/or cell (re)selection, and/or before the AS layer of the UE reports at least one broadcast CAG ID (or SNPN ID) to the NAS layer of the UE during PLMN selection and/or cell (re)selection).

If SIB10 is broadcast periodically, or if SIB10 is (being) broadcast based on the si-scheludingInfo IE in SIB1, the UE may further acquire/receive SIB10 from the serving/camped cell (e.g., before the NAS layer of the UE selects a CAG ID (or SNPN ID) during PLMN selection and/or cell (re) selection, and/or before the AS layer of the UE reports at least one broadcast CAG ID (or SNPN ID) to the NAS layer of the UE during PLMN selection and/or cell (re)selection).

The indication may be a Boolean indicator (e.g., ENUMERATED{true}, ENUMERATED{true, false}, ENUMERATED{enabled}, ENUMERATED{enabled, disabled}, ENUMERATED{allowed}, or ENUMERATED {allowed, not allowed}).

If the indication is a Boolean indicator set to '1', 'true', 'enable', or 'allowed', the UE (e.g., especially an NPN-capable UE configured (or provisioned) with the allowed CAG list) with the selected/registered PLMN/SNPN corresponding to the NPN that associates with the HRNN in the list of HRNN(s), where the indication is associated with the HRNN, may perform at least one of the following actions:

Action 1: The UE may determine the cell transmitting (e.g., via broadcasting or unicasting) the indication as a candidate CAG/SNPN cell for cell (re)selection;

Action 2: The UE may determine the cell transmitting the indication as a candidate CAG cell for cell (re)selection if the HRNN associated with the indication corresponds to a CAG ID, where the CAG ID is in the UE's allowed CAG list; and Action 3: The UE may determine the cell transmitting the indication as a candidate CAG cell for cell (re)selection if the HRNN associated with the indication corresponds to a CAG ID, where the CAG ID is not in the UE's allowed CAG list.

It is noted that if an entry of the HRNN list is associated with an SNPN (or SNPN ID in SIB1), the indication (e.g., manualCAGselectionAllowed-r16 IE in FIG. 3) associated with the entry of the HRNN list may be (always) absent (or null).

If all entries of the HRNN list are associated with SNPN(s) (or SNPN ID(s) in SIB1), there may not be an indication (e.g., manualCAGselectionAllowed-r16 in FIG. 4) associated with the HRNN list. Alternatively, if all entries of the HRNN list are associated with SNPN(s) (or SNPN ID(s) in SIB1), and if there may be an indication (e.g., manualCAGselectionAllowed-r16 IE in FIG. 4) associated with the HRNN list, the indication may (always) be absent (or null).

If the indication is a Boolean indicator set to '0', 'false', 'disabled', or 'not allowed', or is absent, the UE (e.g., especially an NPN-capable UE configured (or provisioned) with the allowed CAG list) with the selected/registered PLMN/SNPN corresponding to the NPN that associates with the HRNN in the list of HRNN(s), where the indication is associated with the HRNN, may perform at least one of the following actions:

Action 1: The UE may or may not determine the cell transmitting (e.g., via broadcasting or unicasting) the indication as a candidate CAG/SNPN cell for cell (re)selection;

Action 2: The UE may determine the cell transmitting the indication as a candidate CAG cell for cell (re)selection if the HRNN associated with the indication corresponds to a CAG ID, where the CAG ID is in the UE's allowed CAG list; and Action 3: The UE may not determine the cell transmitting the indication as a candidate CAG cell for cell (re)selection if the HRNN associated with the indication corresponds to a CAG ID, where the CAG ID is not in the UE's allowed CAG list.

If the UE determines the cell transmitting the indication as a candidate CAG/SNPN cell for cell (re)selection, the AS layer (e.g., RRC layer) of the UE may report at least one CAG ID (and/or SNPN ID and/or PNI-NPN ID) (broadcast via SIB1 by the candidate CAG/SNPN cell) associated with the corresponding indication and/or at least one HRNN associated with the corresponding indication (where the indication may be a Boolean indicator set to '1', 'true', 'enabled', or 'allowed' a Boolean indicator set to '0', 'false', 'disabled', or 'not allowed'; or may be absent) to the NAS layer of the UE. The NAS layer of the UE may select a CAG ID (or SNPN ID) based on the receiving CAG ID(s) (or SNPN ID(s)) from the AS layer (e.g., RRC layer) of the UE. The NAS layer of the UE reports the selected CAG ID (or the selected SNPN ID) to the AS layer of the UE. The AS layer of the UE performs cell (re)selection based on the selected CAG ID (or the selected SNPN ID).

If the UE does not determine the cell transmitting the indication as a candidate CAG/SNPN cell for cell (re) selection, the AS layer (e.g., RRC layer) of the UE may not report any CAG ID (or SNPN ID) (broadcast via SIB1 by the candidate CAG/SNPN cell) nor any associated HRNN associated with the corresponding indication (where the indication may be a Boolean indicator set to '1', 'true', 'enabled', or 'allowed'; a Boolean indicator set to '0', 'false', 'disabled', or 'not allowed'; or may be absent) to the NAS layer of the UE.

The AS layer (e.g., RRC layer) of the UE may determine whether to forward/report the entries of the HRNN list to the upper layer (e.g., NAS layer) of the UE based on whether there is an indication associated with the entries of the HRNN list or the HRNN list. If there is an indication specified to associate with the entries of the HRNN list or the HRNN list, the AS layer (e.g., RRC layer) of the UE may forward/report the associated entries of the HRNN list (or the entries of the associated HRNN list) to the upper layers (e.g., NAS layer) of the UE based on the indication. If there is no indication specified to associate to the entries of the HRNN list or the HRNN list, the AS layer (e.g., RRC layer) of the UE may forward/report the entries of the HRNN list to the upper layer (e.g., NAS layer) of the UE.

If the HRNN list does not associate with the indication and/or if the entries of the HRNN list do not associate with the indication, when the UE (e.g., in RRC_IDLE state, in RRC_INACTIVE state, or in RRC_CONNECTED state while a timer T311 is running, where the UE may start the timer T311 if an RRC connection reestablishment procedure is triggered) receives SIB10, the AS layer (e.g., RRC layer) of the UE may forward/report the entries of the HRNN list with the corresponding identities broadcast by the cell in SIB1 to the upper layer (e.g., NAS layer) of the UE.

When the UE (e.g., in RRC_IDLE state, in RRC_INACTIVE state, or in RRC_CONNECTED state while a timer T311 is running, where the UE may start the timer T311 if an RRC connection reestablishment procedure is triggered) receives SIB10, the AS layer (e.g., RRC layer) of the UE may forward/report the entries in the HRNN list with the corresponding NPN related identities (e.g., CAG ID(s), SNPN ID(s), PNI-NPN ID(s)) associated with the corresponding indication to the upper layer (e.g., NAS layer) of the UE, where the entries are associated with the indication (and/or the indication is a Boolean indicator set to '1', 'true', 'enabled', or 'allowed'), and where the UE may receive the corresponding NPN related identities in SIB1.

In one example, if the UE is configured to perform automatic CAG/SNPN selection, the UE may ignore (or may not check) the indication(s) (e.g., manualCAGselectionAllowed-r16 IE in FIG. 3 and FIG. 4) associated with the corresponding entries of the HRNN list broadcast/unicast by the cell, where the corresponding entries of the HRNN list may associate with the UE's selected/registered PLMN/SNPN (or the identities (e.g., SNPN ID, PNI-NPN ID, CAG ID, or PLMN ID) broadcast by the cell in SIB1). The AS layer (e.g., RRC layer) of the UE may forward/report the entries of HRNN list with the corresponding identities (e.g., SNPN ID, PNI-NPN ID, CAG ID, PLMN ID) broadcast by the cell in SIB1 to the upper layer (e.g., NAS layer) of the UE.

In one example, if the UE is configured to perform manual CAG/SNPN selection (e.g., the NAS layer of the UE may provide a request for searching available CAG(s)/SNPN(s) operating nearby cells to the AS layer of the UE and evaluate a report about available CAG(s)/SNPN(s) operating nearby cells for the CAG/SNPN selection from the AS layer of the UE), the UE may ignore (or may not check) the indication (e.g., manualCAGselectionAllowed-r16 IE in FIG. 3 and FIG. 4) associated with the corresponding entries of the HRNN list broadcast/unicast by the cell, where the corresponding entries of the HRNN list may associate with the UE's selected/registered PLMN/SNPN (or the identities (e.g., SNPN ID, PNI-NPN ID, CAG ID, PLMN ID) broadcast by the cell in SIB1). The AS layer (e.g., RRC layer) of the UE may forward/report the entries of the HRNN list with the corresponding identities (e.g., SNPN ID, PNI-NPN ID, CAG ID, PLMN ID) broadcast by the cell in SIB1 to the NAS layer of the UE.

In one example, if the UE is configured to perform manual CAG/SNPN selection, the UE may check the indication (e.g., manualCAGselectionAllowed-r16 IE in FIG. 3 and FIG. 4) associated with the corresponding entries of the HRNN list (or the corresponding HRNN list) broadcast/unicast by the cell, where the corresponding entries of the HRNN list (or the entries in the corresponding HRNN list) may associate with the UE's selected/registered PLMN/SNPN or the identities (e.g., SNPN ID, PNI-NPN ID, CAG ID, PLMN ID) broadcast by the cell in SIB1.

If the indication is a Boolean indicator set to '1', 'true', 'enabled', or 'allowed', the AS layer (e.g., RRC layer) of the UE may forward/report the corresponding entries in the HRNN list (or the corresponding HRNN list) associated with the indication, together with the corresponding identities (e.g., SNPN ID, PNI-NPN ID, CAG ID, PLMN ID) broadcast by the cell in SIB1, to the upper layer (e.g., NAS layer) of the UE (without checking whether the CAG ID is included in the UE's allowed CAG list).

If the indication is a Boolean indicator set to '0', 'false', 'disabled', or 'not allowed', or is absent, the AS layer (e.g., RRC layer) of the UE may not forward/report the corresponding entries in the HRNN list (or the corresponding HRNN list) associated with the indication, together with the corresponding identities (e.g., SNPN ID, PNI-NPN ID, CAG ID, PLMN ID) broadcast by the cell in SIB1, to the upper layer (e.g., NAS layer) of the UE.

If the indication is a Boolean indicator set to '0', 'false', 'disabled', or 'not allowed', or is absent, the AS layer (e.g., RRC layer) of the UE may further check whether the CAG ID associated with the entry of the HRNN list, where the entry of the HRNN list associates with the indication, is in the UE's allowed CAG list. For example, if the CAG ID is in the UE's allowed CAG list, the AS layer (e.g., RRC layer) of the UE may forward/report the CAG ID, together with the associated entry of the HRNN list, to the upper layer (e.g., NAS layer) of the UE. On the other hand, if the CAG ID is not in the UE's allowed CAG list, the AS layer (e.g., RRC layer) of the UE may not forward/report the CAG ID together with the associated entry of the HRNN list to the NAS layer of the UE.

In one example, if the UE is configured to perform the network-controlled manual CAG selection, the UE may check the indication (e.g., manualCAGselectionAllowed-r16 IE in FIG. 3 and FIG. 4) associated with the corresponding entries of the HRNN list (or the corresponding HRNN list) broadcast/unicast by the cell, where the corresponding entries of the HRNN list (or the entries in the corresponding HRNN list) may associate with the UE's selected/registered PLMN/SNPN or the identities (e.g., SNPN ID, PNI-NPN ID, CAG ID, PLMN ID) broadcast by the cell in SIB1.

If the indication is a Boolean indicator set to '1', 'true', 'enabled', or 'allowed', the AS layer (e.g., RRC layer) of the UE may forward/report the corresponding entries in the HRNN list (or the corresponding HRNN list) associated with the indication, together with the corresponding identities (e.g., SNPN ID, PNI-NPN ID, CAG ID, PLMN ID) broadcast by the cell in SIB1, to the upper layer (e.g., NAS layer) of the UE (without checking whether the CAG ID is included in the UE's allowed CAG list).

If the indication is a Boolean indicator set to '0', 'false', 'disabled', or 'not allowed', or is absent, the AS layer (e.g., RRC layer) of the UE may not forward/report the corresponding entries in the HRNN list (or the corresponding HRNN list) associated with the indication, together with the corresponding identities (e.g., SNPN ID, PNI-NPN ID, CAG ID, PLMN ID) broadcast by the cell in SIB1, to the upper layer (e.g., NAS layer) of the UE.

If the indication is a Boolean indicator set to '0', 'false', 'disabled', or 'not allowed', or is absent, the AS layer (e.g., RRC layer) of the UE may further check whether the CAG ID associated with the entry of the HRNN list, where the entry of the HRNN list associates with the indication, is in the UE's allowed CAG list. For example, the AS layer (e.g., RRC layer) of the UE may forward/report the CAG ID together with the associated entry of the HRNN list to the upper layer (e.g., NAS layer) of the UE. On the other hand, if the CAG ID is not in the UE's allowed CAG list, the AS layer (e.g., RRC layer) of the UE may not forward/report the CAG ID together with the associated entry of the HRNN list to the upper layer (e.g., NAS layer) of the UE.

Suitable Cell Definition

When the UE determines a cell as a candidate CAG cell for cell (re)selection, the UE may further check whether the cell is a suitable cell based on the suitable cell criteria/definition. If the cell fulfills the suitable cell criteria/definition, the UE (e.g., AS layer of the UE) may select the cell and camp on the cell. The suitable cell criteria/definition is disclosed.

For a UE not operating in SNPN access mode, a cell may be considered as suitable cell if the following conditions are fulfilled:

Condition 1: The cell is part of either the selected PLMN or the registered PLMN or PLMN of the equivalent PLMN list, and for that PLMN either:

a. the PLMN ID of that PLMN is broadcast by the cell with no associated CAGIDs and CAG-only indication in the UE for that PLMN (refer to the 3GPP TS 23.501 v16.4.0) is absent or false;

b. the allowed CAG list or the selected CAG ID in the UE for that PLMN (refer to the 3GPP TS 23.501 v16.4.0) includes a CAG ID broadcast by the cell for that PLMN;

c. the selected CAG ID (which may not be in the allowed CAG list) in the UE for that PLMN associates with the indication (which may be a Boolean indicator set to '1', 'true', 'enabled', or 'allowed') broadcast by the cell for that PLMN; or d. the selected CAG ID (which may not be in the allowed CAG list) in the UE for that PLMN associates with the indication (which may be a Boolean indicator set to '1', 'true', 'enabled', or 'allowed') broadcast by the cell for that CAG;

Condition 2: The cell selection criteria are fulfilled based on clause 5.2.3.2 of the 3GPP TS 38.304 v16.0.0.

Condition 3: The NAS layer of the UE provides the latest information to the AS layer of the UE. The latest information may indicate that the cell is not barred based on clause 5.3.1 of the 3GPP TS 38.304 v16.0.0, and/or the cell is part of at least one tracking area (TA) that is not part of the list of "Forbidden Tracking Areas" (refer to the 3GPP TS 22.261 v17.2.0) that belongs to that PLMN.

The terms, such as NW, RAN, cell, camped cell, serving cell, BS, gNB, eNB, and ng-eNB are used interchangeably. Some of these terms may refer to the same network entity.

A serving cell may represent, for a UE in RRC_CONNECTED state not configured with carrier aggregation (CA) or dual connectivity (DC), the primary cell. For a UE in RRC_CONNECTED state configured with CA/DC, the term "serving cells" is used to denote a set of cells comprising the Special Cell(s) and all secondary cells.

The term "Special Cell" may refer to the PCell of the MCG or the PSCell of the SCG, for the DC operation. Otherwise, the term "Special Cell" may refer to the PCell.

The previously mentioned examples may be applied to any RAT. The RAT may be (but may not be limited to) NR, NR-U (NR-Unlicensed, NR-based access to unlicensed spectrum), LTE, E-UTRA connected to 5GC, LTE connected to 5GC, E-UTRA connected to EPC, and LTE connected to EPC.

The previously mentioned examples may be applied to the UEs in public networks or in private networks (e.g., non-public network (NPN), standalone NPN (SNPN), or public network integrated NPN (PNI-NPN)).

The previously mentioned examples may be used for licensed frequency and/or unlicensed frequency.

System information (SI) may refer to MIB, SIB1, and other SI. Minimum SI may include MIB and SIB1. Other SI may refer to SIB3, SIB4, SIB5, and other SIB(s) (e.g., SNPN-specific SIB or PNI-NPN-specific SIB).

Dedicated (RRC) signaling may refer to (but may not be limited to) RRC message(s). For example, the RRC message may include RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message (e.g., UE Assistance Information NR message, UE Assistance Information EUTRA message), UE Capability Enquiry message, UE Capability Information message, UE Information Request message, and UE Information Response message.

The RRC_CONNECTED UE, RRC_INACTIVE UE, and RRC_IDLE UE may apply the previously mentioned examples.

An RRC_CONNECTED UE may be configured with an active BWP with common search space configured to monitor system information or paging.

Generally, the previously mentioned examples may be applied to the PCell and the UE. The previously mentioned examples may be applied to the PSCell and the UE. A short message and/or a paging downlink control information (DCI) may be transmitted by the PSCell (or a secondary node) to the UE. The UE may monitor the PDCCH monitoring occasions for the paging configured by the PSCell (or a secondary node).

Allowed CAG list may represent a per-PLMN list of CAG identifiers that the UE is allowed to access.

CAG cell may refer to the cell broadcasting at least one CAG identifier.

CAG may represent CAG(s) operating nearby cells, and the CAG(s) may be identified by the CAG ID(s) broadcast by the nearby cells.

CAG member cell may represent, for a UE, the cell broadcasting an identity of the selected PLMN, registered PLMN, or equivalent PLMN, and for that PLMN, a CAG identifier belonging to the allowed CAG list of the UE for that PLMN.

CAG identifier may be used for identifying a CAG within a PLMN.

Network identifier may be used for identifying an SNPN in combination with a PLMN ID.

NPN may refer to the network deployed for a non-public usage.

NPN-only cell may refer to the cell that is only available for normal services for the NPN's subscribers. An NPN-capable UE determines that a cell is an NPN-only cell by detecting that the cellReservedForOtherUse IE is set to true while the npn-IdentityInfoList IE is present in CellAccessRelatedInfo IE.

PNI-NPN identity may represent the identifier of a PNI-NPN comprising a PLMN ID and a CAG ID combination.

Registered SNPN may refer to the SNPN on which certain location registration outcomes have occurred.

Selected SNPN may refer to the SNPN that has been selected by the NAS (e.g., the NAS layer of the UE, or the NAS layer of the CN), either manually or automatically.

SNPN access mode may represent the mode of operation where the UE only selects SNPNs.

SNPN identity may represent the identifier of an SNPN comprising a PLMN ID and an NID combination.

SNPN-only cell may refer to the cell that is only available for normal services for SNPN subscribers.

If the AS layer of the UE reports a CAG ID broadcast by the serving/camped cell, where the CAG ID is not in the allowed CAG list, to the NAS layer of the UE, the NAS layer of the UE may prioritize the CAG ID to be selected. The NAS layer of the UE may inform the selected CAG ID to the AS layer of the UE.

A non-NPN capable UE (e.g., a legacy/advanced UE (e.g., Rel-15 UE, Rel-16 UE) without NPN function/capability) may ignore the indication(s) when the non-NPN capable UE reads/receives the indication(s) from the system information (e.g., SIB1, SIB10).

An NPN-capable UE may refer to the UE supporting CAG (or NPN).

FIG. 5 is a flowchart illustrating a method 500 for a UE to perform CAG selection in an NPN. In action 502, the UE receives a first indication and a CAG ID from a CAG cell via SIB1, where the first indication is associated with the CAG ID and indicates that the CAG ID is allowed to be selected manually even if the CAG ID is not included in (or is absent in) an allowed CAG list of the UE. In action 504, the UE reports, by the AS layer of the UE, to the NAS layer of the UE, the first indication and the CAG ID when a request from the NAS layer of the UE is received. In action 506, the UE performs a cell selection or reselection procedure according to the CAG ID.

In some examples, the request transmitted from the NAS layer of the UE to the AS layer of the UE indicates the AS layer of the UE to search available CAG cells.

In some examples, the request transmitted from the NAS layer of the UE to the AS layer of the UE indicates the AS layer of the UE to report the first indication if received.

In some examples, the request transmitted from the NAS layer of the UE to the AS layer of the UE indicates the AS layer of the UE to report the CAG ID if received.

In some examples, the request transmitted from the NAS layer of the UE to the AS layer of the UE indicates the AS layer of the UE to report the first indication and the associated CAG ID(s).

In one example, the NAS layer of the UE further determines whether the CAG ID is included in the allowed CAG list. The AS layer of the UE reports the first indication and the CAG ID (e.g., via PNI-NPN ID including PLMN ID and the CAG ID) when the CAG ID is included in the allowed CAG list or is not included in (or is absent in) the allowed CAG list to the NAS layer of the UE.

In one example, the UE determines the CAG cell broadcasting the first indication and the CAG ID as a candidate cell for the previously mentioned cell selection or reselection procedure even if the CAG identity is not included in (or is absent in) the allowed CAG list.

In one example, the UE is configured, by the NAS layer, with not operating in the SNPN access mode.

In one example, the UE is configured, by the NAS layer, with a manual CAG selection mode before the first indication is received.

In one example, during the previously mentioned cell selection or reselection procedure, the UE performs the following actions:

Action 1: The UE selects, by the NAS layer of the UE, the CAG ID;

Action 2: The UE reports, by the NAS layer of the UE, to the AS layer of the UE, the selected CAG identity; and Action 3: The UE performs, by the AS layer of the UE, the cell selection or reselection procedure according to the selected CAG ID (e.g., the UE selects, by the AS layer of the UE, a suitable cell broadcasting the selected CAG ID).

In one example, after the UE selects the suitable cell, the UE initiates, by the AS layer of the UE, a registration procedure via the suitable cell.

In one example, the UE may receive an HRNN via SIB10, and the UE reports, by the AS layer of the UE, to the NAS layer of the UE, the first indication, the CAG ID, and the HRNN.

Figure 6:
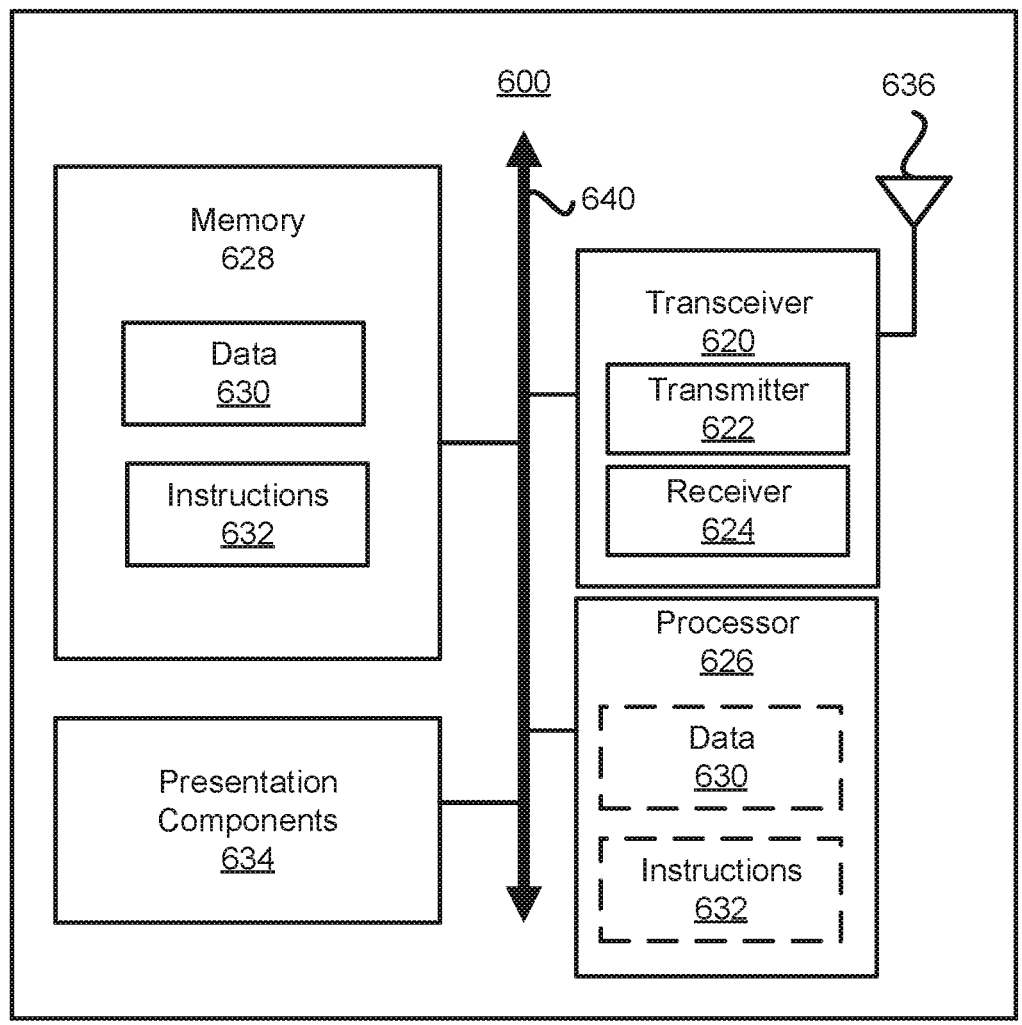
FIG. 6 is a block diagram illustrating a node for wireless communication, according to an implementation of the present disclosure.

FIG. 6 is a block diagram illustrating a node 600 for wireless communication, according to an implementation of the present disclosure.

As illustrated in FIG. 6, the node 600 may include a transceiver 620, a processor 626, a memory 628, one or more presentation components 634, and at least one antenna 636. The node 600 may also include a Radio Frequency (RF) spectrum band module, a BS communications module, a network communications module, a system communications management module, input/output (I/O) ports, I/O components, and a power supply (not illustrated in FIG. 6).

Each of these components may be in communication with each other, directly or indirectly, over one or more buses 640. The node 600 may be a UE or a BS that performs various disclosed functions illustrated in FIG. 5 and examples in this disclosure.

The transceiver 620 may include a transmitter 622 (with transmitting circuitry) and a receiver 624 (with receiving circuitry) and may be configured to transmit and/or receive time and/or frequency resource partitioning information. The transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media may be any media that can be accessed by the node 600 and include both volatile (and non-volatile) media and removable (and non-removable) media. Computer-readable media may include computer storage media and communication media. Computer storage media may include both volatile (and/or non-volatile), as well as removable (and/or non-removable), media implemented according to any method or technology for storage of information such as computer-readable media.

Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the disclosed media should be included within the scope of computer-readable media.

The memory 628 may include computer-storage media in the form of volatile and/or non-volatile memory. The memory 628 may be removable, non-removable, or a combination thereof. For example, the memory 628 may include solid-state memory, hard drives, optical-disc drives, etc. As illustrated in FIG. 6, the memory 628 may store computer-readable and/or computer-executable instructions 632 (e.g., software codes) that are configured to, when executed, cause the processor 626 (e.g., processing circuitry) to perform various disclosed functions. Alternatively, the instructions 632 may not be directly executable by the processor 626 but may be configured to cause the node 600 (e.g., when compiled and executed) to perform various disclosed functions.

The processor 626 may include an intelligent hardware device, a central processing unit (CPU), a microcontroller, an ASIC, etc. The processor 626 may include memory. The processor 626 may process the data 630 and the instructions 632 received from the memory 628, and information received through the transceiver 620, the baseband communications module, and/or the network communications module. The processor 626 may also process information to be sent to the transceiver 620 for transmission via the antenna 636, and/or to the network communications module for transmission to a CN.

One or more presentation components 634 may present data to a person or other devices. Presentation components 634 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of performing a closed access group (CAG) selection in a non-public network (NPN) for a user equipment (UE), the method comprising:

receiving, from a CAG cell, a first indication and a CAG identity via a System Information Block 1 (SIB1), the first indication being associated with the CAG identity and indicating that the CAG identity is allowed to be selected manually even if the CAG identity is not included in an allowed CAG list of the UE;

reporting, by an Access Stratum (AS) layer of the UE, to a Non-Access Stratum (NAS) layer of the UE, the first indication and the CAG identity when a request from the NAS layer is received;

determining whether to apply the first indication to perform a cell selection or reselection procedure based on whether the UE is operating in a standalone non-public network (SNPN) access mode;

performing the cell selection or reselection procedure according to the CAG identity and the first indication in a case that the UE is determined not to be operating in the SNPN access mode; and determining, by the NAS layer, whether the CAG identity is included in the allowed CAG list, wherein reporting, by the AS layer, to the NAS layer, the first indication and the CAG identity when the request from the NAS layer is received comprises:

reporting, by the AS layer, to the NAS layer, the first indication and the CAG identity when the CAG identity is determined to be included in the allowed CAG list.

2. The method of claim 1,
wherein reporting, by the AS layer, to the NAS layer, the first indication and the CAG identity when the request from the NAS layer is received further comprises:
reporting, by the AS layer, to the NAS layer, the first indication and the CAG identity when the CAG identity is not included in the allowed CAG list.

3. The method of claim 1, further comprising:
configuring, by the NAS layer, a manual CAG selection mode before the first indication is received.

4. The method of claim 1, wherein the request indicates to the AS layer to search for available CAG cells.

5. The method of claim 1, wherein performing the cell selection or reselection procedure according to the CAG identity comprises:
selecting, by the NAS layer, the CAG identity;
reporting, by the NAS layer, to the AS layer, the selected CAG identity; and
performing, by the AS layer, the cell selection or reselection procedure according to the selected CAG identity.

6. The method of claim 5, wherein performing, by the AS layer, the cell selection or reselection procedure according to the selected CAG identity comprises:
selecting, by the AS layer, a suitable cell broadcasting the selected CAG identity.

7. The method of claim 6, further comprising:
initiating, by the AS layer, a registration procedure via the suitable cell.

8. The method of claim 1, further comprising:
receiving a Human Readable Network Name (HRNN) via a System Information Block 10 (SIB10),
wherein reporting, by the AS layer, to the NAS layer, the first indication and the CAG identity when the request from the NAS layer is received further comprises reporting, by the AS layer, to the NAS layer, the HRNN along with the first indication and the CAG identity.

9. The method of claim 1, wherein reporting, by the AS layer, to the NAS layer, the first indication and the CAG identity when the request from the NAS layer is received further comprises:
reporting, by the AS layer, to the NAS layer, the first indication and a public network integrated non-public network (PNI-NPN) identity including the CAG identity and a public land mobile network (PLMN) identity associated with the CAG identity.

10. The method of claim 1, further comprising:
determining the CAG cell as a candidate cell for the cell selection or reselection procedure,
wherein determining the CAG cell as the candidate cell comprises determining the CAG cell as the candidate cell even if the CAG identity is not included in the allowed CAG list.

11. A user equipment (UE) for performing a closed access group (CAG) selection in a non-public network (NPN), the UE comprising:
at least one processor; and
at least one memory coupled to the at least one processor and storing computer-executable instructions that, when executed by the at least one processor, cause the UE to:
receive, from a CAG cell, a first indication and a CAG identity via a System Information Block 1 (SIB1), the first indication being associated with the CAG identity and indicating that the CAG identity is allowed to be selected manually even if the CAG identity is not included in an allowed CAG list of the UE;
report, by an Access Stratum (AS) layer of the UE, to a Non-Access Stratum (NAS) layer of the UE, the first indication and the CAG identity when a request from the NAS layer is received;
determine whether to apply the first indication to perform a cell selection or reselection procedure based on whether the UE is operating in a standalone non-public network (SNPN) access mode;
perform the cell selection or reselection procedure according to the CAG identity and the first indication in a case that the UE is determined not to be operating in the SNPN access mode; and
determine, by the NAS layer, whether the CAG identity is included in the allowed CAG list,
wherein reporting, by the AS layer, to the NAS layer, the first indication and the CAG identity when the request from the NAS layer is received comprises:
reporting, by the AS layer, to the NAS layer, the first indication and the CAG identity when the CAG identity is determined to be included in the allowed CAG list.

12. The UE of claim 11,
wherein reporting, by the AS layer, to the NAS layer, the first indication and the CAG identity when the request from the NAS layer is received further comprises:
reporting, by the AS layer, to the NAS layer, the first indication and the CAG identity when the CAG identity is not included in the allowed CAG list.

13. The UE of claim 11, wherein the computer-executable instructions, when executed by the at least one processor, further cause the UE to:
configure, by the NAS layer, a manual CAG selection mode before the first indication is received.

14. The UE of claim 11, wherein the request indicates to the AS layer to search for available CAG cells.

15. The UE of claim 11, wherein the computer-executable instructions, when executed by the at least one processor, further cause the UE to:
select, by the NAS layer, the CAG identity;
report, by the NAS layer, to the AS layer, the selected CAG identity; and
perform, by the AS layer, the cell selection or reselection procedure according to the selected CAG identity.

16. The UE of claim 15, wherein the computer-executable instructions, when executed by the at least one processor, further cause the UE to:
select, by the AS layer, a suitable cell broadcasting the selected CAG identity.

17. The UE of claim 16, wherein the computer-executable instructions, when executed by the at least one processor, further cause the UE to:
initiate, by the AS layer, a registration procedure via the suitable cell.

18. The UE of claim 11, wherein the computer-executable instructions, when executed by the at least one processor, further cause the UE to:
receive a Human Readable Network Name (HRNN) via a System Information Block 10 (SIB10),
wherein reporting, by the AS layer, to the NAS layer, the first indication and the CAG identity when the request from the NAS layer is received further comprises reporting, by the AS layer, to the NAS layer, the HRNN along with the first indication and the CAG identity.

19. The UE of claim 11, wherein reporting, by the AS layer, to the NAS layer, the first indication and the CAG identity when the request from the NAS layer is received further comprises:

reporting, by the AS layer, to the NAS layer, the first indication and a public network integrated non-public network (PNI-NPN) identity including the CAG identity and a public land mobile network (PLMN) identity associated with the CAG identity.

20. The UE of claim 11, wherein the computer-executable instructions, when executed by the at least one processor, further cause the UE to:

determine the CAG cell as a candidate cell for the cell selection or reselection procedure even if the CAG identity is not included in the allowed CAG list.

* * * * *